US008107236B2

(12) United States Patent
Lin

(10) Patent No.: US 8,107,236 B2
(45) Date of Patent: Jan. 31, 2012

(54) LOCKING BASE FOR ANTI-THEFT LOCK

(75) Inventor: Yu-Yuan Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 167 days.

(21) Appl. No.: 12/553,103

(22) Filed: Sep. 3, 2009

(65) Prior Publication Data

US 2011/0005281 A1 Jan. 13, 2011

(30) Foreign Application Priority Data

Jul. 9, 2009 (TW) ............................... 98123233 A

(51) Int. Cl.
*G06F 1/16* (2006.01)

(52) U.S. Cl. .............. 361/679.57; 361/679.26; 361/727; 70/14; 70/25; 70/28; 292/293; 292/295; 312/223.1; 312/223.2; 248/551; 248/552; 248/553

(58) Field of Classification Search ............. 361/679.57, 361/727
See application file for complete search history.

(56) References Cited

U.S. PATENT DOCUMENTS

| | | | | | |
|---|---|---|---|---|---|
| 3,599,453 | A * | 8/1971 | Bauernfeind | | 70/129 |
| 3,707,860 | A * | 1/1973 | Singer et al. | | 70/58 |
| 3,965,705 | A * | 6/1976 | Nadler | | 70/58 |
| 4,353,521 | A * | 10/1982 | Webb | | 248/552 |
| 4,843,848 | A * | 7/1989 | Igelmund | | 70/58 |
| 5,288,049 | A * | 2/1994 | Hays | | 248/298.1 |
| 5,361,610 | A * | 11/1994 | Sanders | | 70/14 |
| 5,547,236 | A * | 8/1996 | Gregory | | 292/148 |
| 5,608,605 | A * | 3/1997 | Siow et al. | | 361/679.43 |
| 5,787,738 | A * | 8/1998 | Brandt et al. | | 70/58 |
| 5,944,550 | A * | 8/1999 | Vindigni | | 439/333 |
| 5,987,937 | A * | 11/1999 | Lee | | 70/14 |
| 6,006,557 | A * | 12/1999 | Carl et al. | | 70/58 |
| 6,094,949 | A * | 8/2000 | Lagerberg et al. | | 70/14 |
| 6,742,366 | B1 * | 6/2004 | Lai | | 70/58 |
| 7,431,322 | B1 * | 10/2008 | Malak | | 280/617 |
| 2004/0112098 | A1 * | 6/2004 | Bonelli et al. | | 70/58 |
| 2006/0243006 | A1 * | 11/2006 | Christensen et al. | | 70/58 |
| 2006/0266086 | A1 * | 11/2006 | Bakker et al. | | 70/58 |
| 2010/0142135 | A1 * | 6/2010 | Carney et al. | | 361/679.02 |
| 2010/0206018 | A1 * | 8/2010 | Thorne | | 70/58 |
| 2010/0320884 | A1 * | 12/2010 | Shiroishi et al. | | 312/223.1 |

FOREIGN PATENT DOCUMENTS

TW 317309 10/1997

* cited by examiner

*Primary Examiner* — Jinhee Lee
*Assistant Examiner* — Anthony Q Edwards
(74) *Attorney, Agent, or Firm* — Jianq Chyun IP Office

(57) ABSTRACT

A locking base for Anti-theft lock includes a socket, a locking member and two sliding portions. The socket is disposed in a main body and extends a portion out of the main body. The locking member has a locking hole, and the locking member can extend out of the portion of the socket. The two sliding portions are disposed on the socket and the locking member respectively. The two sliding portions are matched structurally to make the socket and locking member slide correspondingly.

12 Claims, 5 Drawing Sheets

LOCKING BASE FOR ANTI-THEFT LOCK

CROSS-REFERENCE TO RELATED APPLICATION

This application claims the priority benefit of Taiwan application serial no. 98123233, filed on Jul. 9, 2009. The entirety of the above-mentioned patent application is hereby incorporated by reference herein and made a part of specification.

BACKGROUND OF THE INVENTION

1. Field of the Invention

The invention relates to a locking base for anti-theft lock, and in particular, relates to a locking base for anti-theft lock with sliding functions.

2. Description of Related Art

FIG. 1 illustrates a conventional anti-theft lock of a laptop. A locking hole 11 is disposed at an end of an anti-theft lock 10, a T-shaped locking component 12 is disposed at the other end, and the bottom of the anti-theft lock 10 connects to a steel wire 13. An additional locking hole 21 is installed on a laptop 20 corresponding to the T-shaped locking component 12. When the T-shaped locking component 12 is inserted into the additional locking hole 21 and turned 90°, the effect of fastening is achieved. However, the size of the ordinary anti-theft lock 10 is greater than the thickness of the body of the laptop 20, which is unfavorable for locking from the side of the body of the laptop.

FIG. 2 illustrates another conventional anti-theft lock of a laptop. The major structure of the lock is constructed from a movable steel plate 30 and an L-shaped fixed steel plate 40. The structure is assembled within a predetermined space of the inner structure between a battery housing place 22 and a system housing 23. A show/hide controlling pushing plate 31 is extended from the lower edge of the movable steel plate 30 with a locking round hole 32 in the front end, and two small round holes 33 are drilled on two terminal points of the show/hide path of the movable steel plate 30. An elastic sheet 41 is disposed on the vertical surface of the L-shaped fixed steel plate 40. A round protruding point 42 is protrudently disposed inward the front tip of the elastic sheet 41. When assembling, the horizontal surface of the L-shaped fixed steel plate 40 is fixed on the battery housing place 22. The movable steel plate 30 is fixed in the gap between the battery housing place 22 and the vertical surface thereof. The round protruding point 42 of the elastic sheet 41 matches the small round holes 33 of the movable steel plate 30 so that two manipulations of show/hide are established. When the movable steel plate 30 is pushed outward, the locking round hole 32 is exposed outside a rectangular hole 25. Users can used an ordinary lock 50 paired with a steel wire 60 to go through the locking round hole 32 for preventing the laptop 20 from being stolen.

However, a sliding track 24 with enough length needs to be established on the bottom of the system housing 23 for the path of the movable steel plate 30 moving outward and inward. As a result, another die-sinking is needed for the system housing 23 to suit the design of the movable steel plate 30. Moreover, the path of the movable steel plate 30 being pushed outward is mechanically limited. The body of the lock 50 is too big for the locking from the side of the body of the laptop. Besides, the locking structure is not strong enough since the movable steel plate 30 and the L-shaped steel plate 40 merely click with each other by the small round holes 33 and the round protruding point 42. If the movable steel plate 30 is damaged by thieves with tools, there is no effective way to prevent the stealing.

SUMMARY OF THE INVENTION

The invention provides a locking base for anti-theft lock without changing the design of a housing.

The invention provides a locking base for anti-theft lock which can suitably extend out of the housing and is barely affected by the size of the anti-theft.

The invention provides an electronic device disposed with a locking base for anti-theft lock so that theft is prevented.

The invention provides a locking base for anti-theft lock, which includes a socket, a locking member, and two sliding portions. The socket is disposed in a main body and extending a portion out. The locking member has a locking hole and extends out of the portion of the socket. The two sliding portions are disposed respectively on the socket and the locking member, and are matched structurally to make the socket and the locking member slide correspondingly.

The invention provides an electronic device, which includes a main body, a socket, a locking member, and two sliding portions. The main body has a receptacle slot. The socket is disposed in the main body and extending a portion out. The locking member has a locking hole and extends out of the portion of the socket, and the locking hole is locked with the anti-theft lock. The two sliding portions are disposed respectively on the socket and the locking member, and are matched structurally to make the socket and the locking member slide correspondingly.

In an embodiment of the invention, the socket and the locking member are suitable for being taken in the receptacle slot.

In an embodiment of the invention, the socket has a long hole and a fixed pin, the fixing pin is held in the long hole and is connected with the main body, and when the socket moves from the receptacle slot and extends the portion outward the receptacle slot, the fixing pin relatively moves from one end of the long hole to the another end.

In an embodiment of the invention, the socket has a receptacle space for taking in the locking member when the locking member is in the main body.

In an embodiment of the invention, the two sliding portions are integrally formed respectively on the socket and the locking member, and slide correspondingly on the horizontal direction.

In an embodiment of the invention, the two sliding portions are inserted into each other on the vertical direction of the socket and the locking member.

In an embodiment of the invention, the two sliding portions include a sliding track disposed on the socket and a sliding piece disposed on the locking member.

In an embodiment of the invention, the two sliding portions include a sliding track disposed on the locking member and a sliding piece disposed on the socket.

Based on the above, the locking member and the socket are disposed on the main body according to the present invention, and the locking member can extend out of the socket to be exposed outside the main body of the electronic device. Meanwhile, the locking member of the invention can facilitate the installation of an anti-theft lock, is barely affected by the size of the anti-theft, and can be taken in the socket when not in use.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

According to an embodiment of the invention, a locking base for anti-theft lock is provided, which is suitable for electronic devices on exhibition or small electronic devices easily stolen, e.g. mobile phones, laptops, multimedia player, etc.

Figure 1:
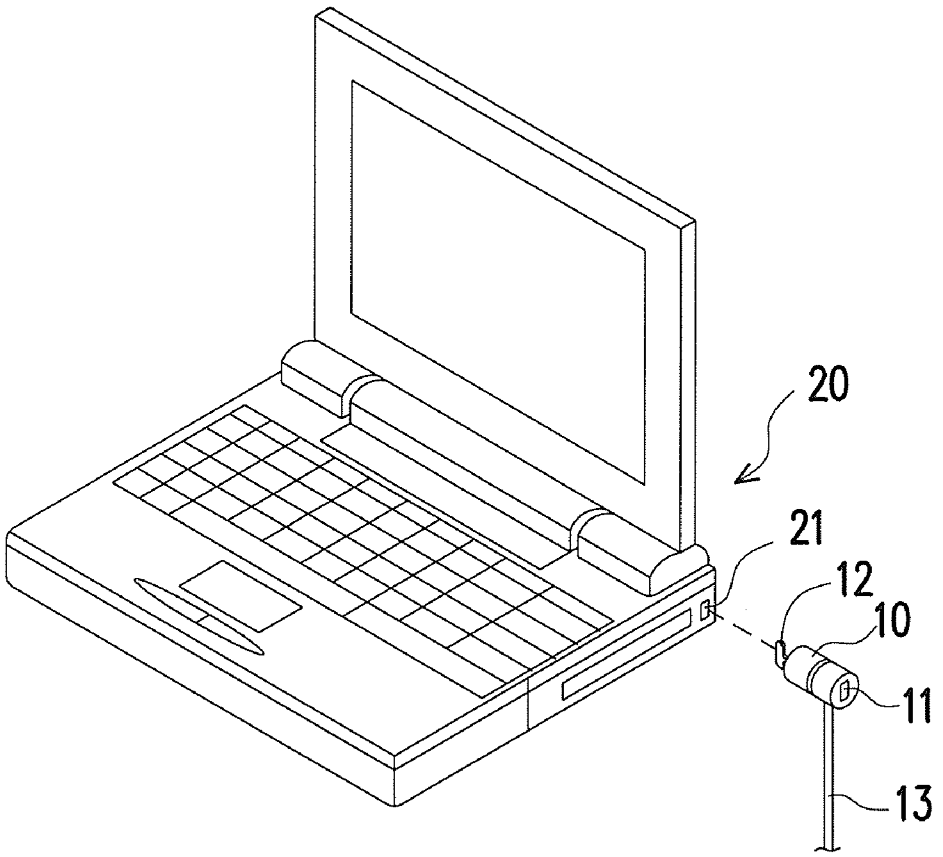
FIG. 1 (RELATED ART)
FIG. 1 is a schematic view of a conventional anti-theft lock of a laptop.
Figure 2:
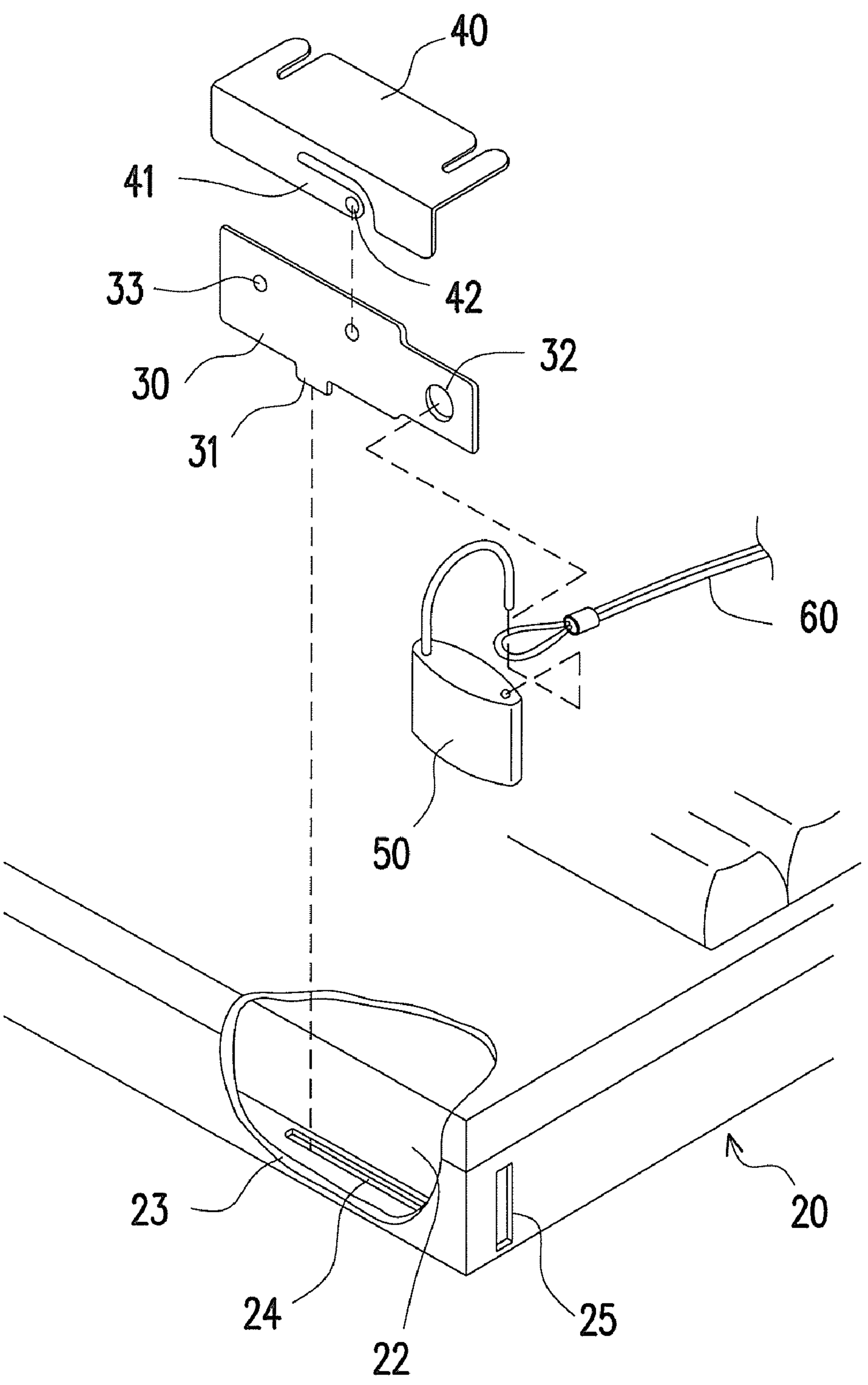
FIG. 2 (RELATED ART)
FIG. 2 is a schematic view of another conventional anti-theft lock of a laptop.
Figure 3:
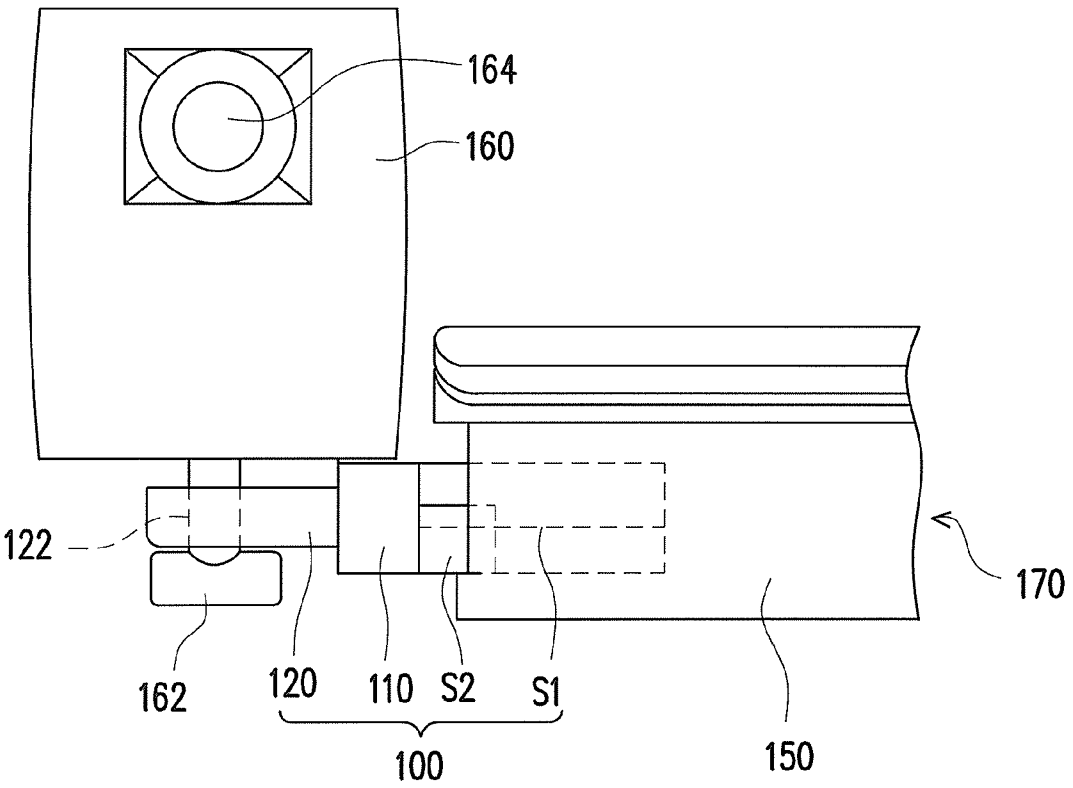
FIG. 3 is a schematic side view of a locking base for anti-theft lock according to an embodiment of the invention.

FIG. 3 illustrates a locking base 100 for anti-theft lock of an embodiment of the invention. The locking base 100 for anti-theft lock includes a socket 110, a locking member 120, and two sliding portions S1 and S2. When in use, the socket 110 and the locking member 120 can slide correspondingly to be exposed outside a main body 150 of an electronic device 170. That is, the socket 110 can extend a portion outward the main body 150 of the electronic device 170 and the locking member 120 can further extend another portion outward along the socket 110. As a result, the total length of the outward extension becomes longer. When an anti-theft lock 160 locks with the locking base 110, a T-shaped locking component 162 is inserted downward into a locking hole 122 of the locking member 120 and then turned 90° for fastening. A side surface of the anti-theft lock 164 connects a steel wire 164 to secure the position thereof.

While an anti-theft lock is inserted into a locking hole from the side of a lock in the prior art, the locking hole 122 of the locking member 120 of the invention is facing upward to facilitate the installation of the anti-theft lock 160 without being affected by the bigger size of the anti-theft lock 160.

Figure 4A:
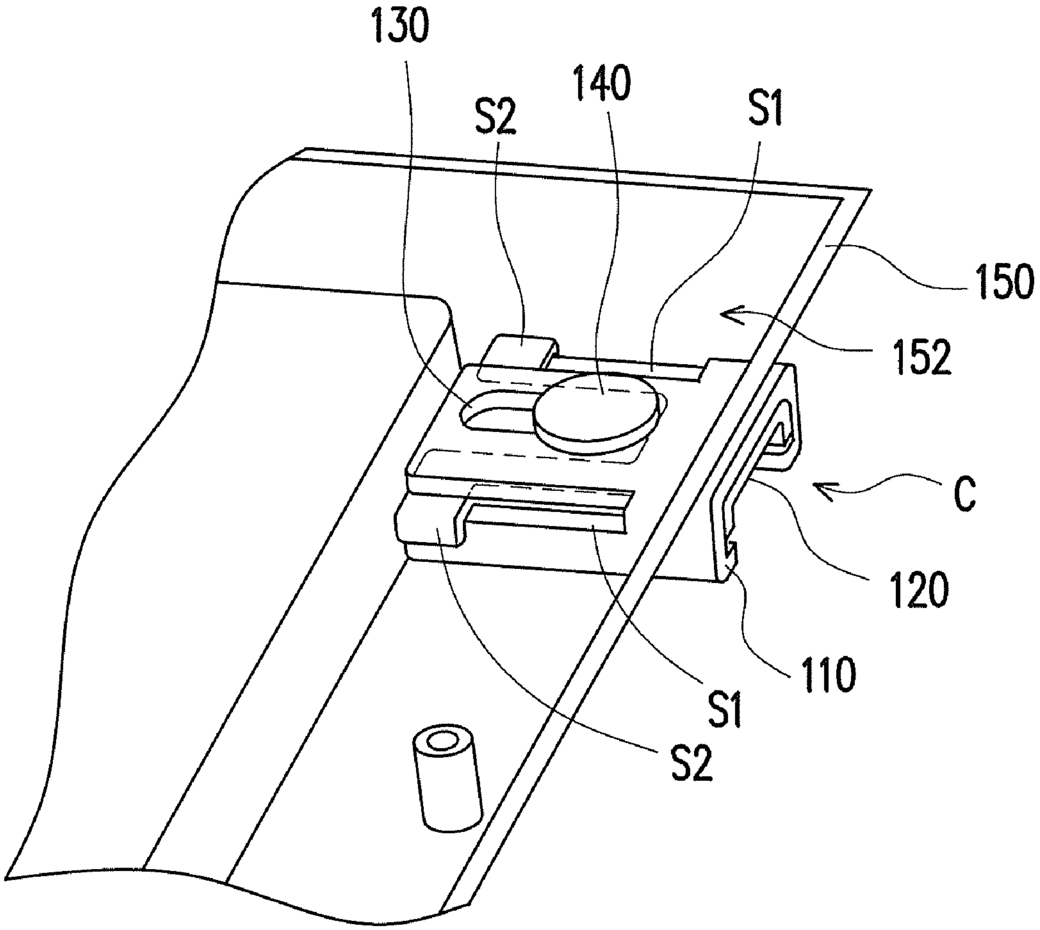
FIG. 4A and FIG. 4B is a schematic view of a locking base for anti-theft lock according to an embodiment of the invention.
Figure 4B:
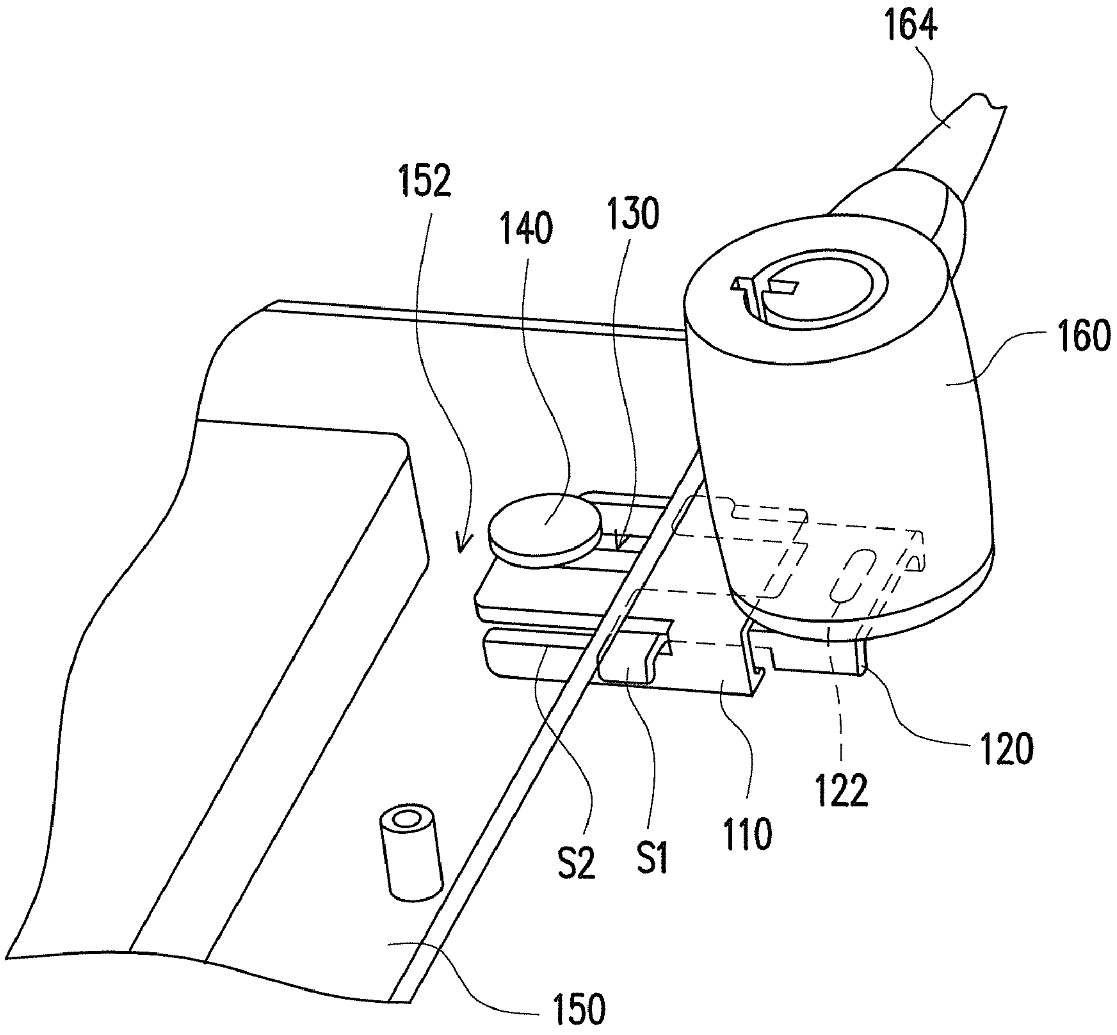

The detailed structures of the socket 110 and the locking member 120 disposed in the main body 150 of the electronic device 170 are explained below. Referring to FIGS. 4A and 4B, when not in use, the socket 110 and the locking member 120 can be taken in a receptacle slot 152 of the main body 150. The socket 110 includes a long hole 130 and a fixing pin 140. The fixing pin 140 is held in the long hole 130 and connected with the main body 150. When the socket 110 moves outward from the receptacle slot 152 and extends a portion out, the fixing pin 140 correspondingly moves from one end of the long hole 130 to the other. The length of the extended portion of the socket 110 depends on the size (long or short) of the long hole 130. According to an embodiment of the invention, the socket 110 includes, for example, a receptacle space C. When the locking member 120 is in the main body 150, it can be taken in the receptacle space C, such that the size of the socket 110 and the locking member 120 is minimized.

In addition, the side surface of the socket 110 includes a sliding portion S1 with, for example, two sliding tracks (each disposed on the opposite side), and the locking member 120 includes a sliding portion S2 with, for example, two sliding pieces (each disposed on the opposite side and away from the locking hole 122). The two sliding pieces of the locking member 120 can firmly lean against the two sliding tracks of the socket 110 so that two sliding portions S1 and S2 are matched structurally and the socket 110 and the locking member 120 can further slide correspondingly on the horizontal direction. In a preferable situation, the two sliding portions S1 and S2 are integrally formed respectively on the socket 110 and the locking member 120, and slide correspondingly on the horizontal direction. Moreover, the two sliding portions S1 and S2 are inserted into each other on the vertical direction. The material thereof can be steels of high strength and the sliding portions S1 and S2 can be molded by press working. Therefore, the strength of structure is increased to prevent the sliding portions from being damaged by thieves with tools.

According to another embodiment of the invention (not illustrated), a socket includes a sliding portion such as a sliding piece and a locking member includes another sliding portion such as a sliding tract. The two sliding portions are matched structurally, which also can make the socket and the locking member slide correspondingly on the horizontal direction, and be inserted into each other on the vertical direction.

It can be know from the above description that the locking base 100 for anti-theft lock is disposed on the main body 150 of the electronic device 170, and the locking base 100 includes a socket 110, a locking member 120, and two sliding portions S1 and S2. The socket 110 and the locking member 120 can slide correspondingly through the two sliding portions to increase the extension distance of the socket 110 and the locking member 120 outside the main body 150. When the locking member 120 and the anti-theft lock 160 are unlocked, the locking member 120 can be taken in the socket 110, and the socket 110 and the locking member 120 can further be taken in the receptacle slot 152 of the main body 150. The aesthetic view of the appearance will not be affected, not to mention the users' operation. The invention provides practical effects. Compared with conventional locking bases for anti-theft lock, the invention needs no sliding slots to be installed on the bottom of the housing, no additional die-sinking, and the assembly time and production cost are reduced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A locking base for anti-theft lock, comprising:

a socket disposed in a main body and extending a portion out, wherein the main body has a receptacle slot, the socket has a long hole and a fixing pin, the fixing pin is held in the long hole and is connected with the main body;

a locking member having a locking hole, the locking member extending out of the portion of the socket, wherein the socket and the locking member are taken in the receptacle slot; and two sliding portions disposed on the socket and the locking member respectively, the two sliding portions matched structurally to make the socket and locking member slide correspondingly, wherein when the socket moves and extends the portion outward the receptacle slot, the fixing pin relatively moves from one end of the long hole to the another end.

2. The locking base for anti-theft lock of claim 1, wherein the socket has a receptacle space for taking in the locking member when the locking member is in the main body.

3. The locking base for anti-theft lock of claim 1, wherein the two sliding portions are integrally formed respectively on the socket and the locking member, and slide correspondingly on the horizontal direction.

4. The locking base for anti-theft lock of claim 3, wherein the two sliding portions are inserted into each other on the vertical direction of the socket and the locking member.

5. The locking base for anti-theft lock of claim 1, wherein the two sliding portions comprise a sliding track disposed on the socket and a sliding piece disposed on the locking member.

6. The locking base for anti-theft lock of claim 1, wherein the two sliding portions comprise a sliding track disposed on the locking member and a sliding piece disposed on the socket.

7. An electronic device suitable for being locked by an anti-theft lock, comprising:

a main body having a receptacle slot;

a socket disposed in the main body and extending a portion out, having a long hole and a fixing pin, wherein the fixing pin is held in the long hole and is connected with the main body;

a locking member having a locking hole, the locking member extending out of the portion of the socket, the locking hole locked with the anti-theft lock, wherein the socket and the locking member are taken in the receptacle slot; and two sliding portions disposed on the socket and the locking member respectively, the two sliding portions matched structurally to make the socket and the locking member slide correspondingly, wherein when the socket moves and extends the portion outward the receptacle slot, the fixing pin relatively moves from one end of the long hole to the another end.

8. The electronic device of claim 7, wherein the socket has a receptacle space for taking in the locking member when the locking member is in the main body.

9. The electronic device of claim 7, wherein the two sliding portions are integrally formed respectively on the socket and the locking member, and slide correspondingly on the horizontal direction.

10. The electronic device of claim 9, wherein the two sliding portions are inserted into each other on the vertical direction of the socket and the locking member.

11. The electronic device of claim 7, wherein the two sliding portions comprise a sliding track disposed on the socket and a sliding piece disposed on the locking member.

12. The electronic device of claim 7, wherein the two sliding portions comprise a sliding track disposed on the locking member and a sliding piece disposed on the socket.

* * * * *